United States Patent
Nakazawa

(10) Patent No.: US 6,419,407 B1
(45) Date of Patent: Jul. 16, 2002

(54) LENS BARRIER DEVICE FOR CAMERA

(75) Inventor: Isao Nakazawa, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 09/659,796

(22) Filed: Sep. 12, 2000

(30) Foreign Application Priority Data

Sep. 16, 1999 (JP) .......................................... 11-261446

(51) Int. Cl.[7] .............................................. G03B 17/00
(52) U.S. Cl. ...................................... 396/448; 396/349
(58) Field of Search ................................ 396/349, 448; 359/511

(56) References Cited

U.S. PATENT DOCUMENTS

| | | | | |
|---|---|---|---|---|
| 5,159,372 A | * | 10/1992 | Nomura et al. ............. | 396/448 |
| 5,486,889 A | * | 1/1996 | Shintani ...................... | 359/511 |
| 5,614,973 A | * | 3/1997 | Azegami ..................... | 396/448 |
| 5,842,057 A | * | 11/1998 | Nomura et al. ............. | 396/269 |
| 5,862,426 A | * | 1/1999 | Ichino et al. ................ | 359/511 |

* cited by examiner

Primary Examiner—Alan A. Mathews
(74) Attorney, Agent, or Firm—Robin, Blecker & Daley

(57) ABSTRACT

A lens barrier device for a camera includes a main blade member located on a plane approximately perpendicular to an optical axis of a photo-taking lens of the camera and arranged to perform opening and closing actions by moving on the plane approximately perpendicular to the optical axis, an auxiliary blade member located on one and the same plane as the main blade member and arranged to perform opening and closing actions by moving on one and the same plane as the main blade member, and a driving part arranged to drive the main blade member to perform the opening and closing actions, wherein the auxiliary blade member is arranged to perform the opening and closing actions by being pushed by the main blade member.

7 Claims, 3 Drawing Sheets

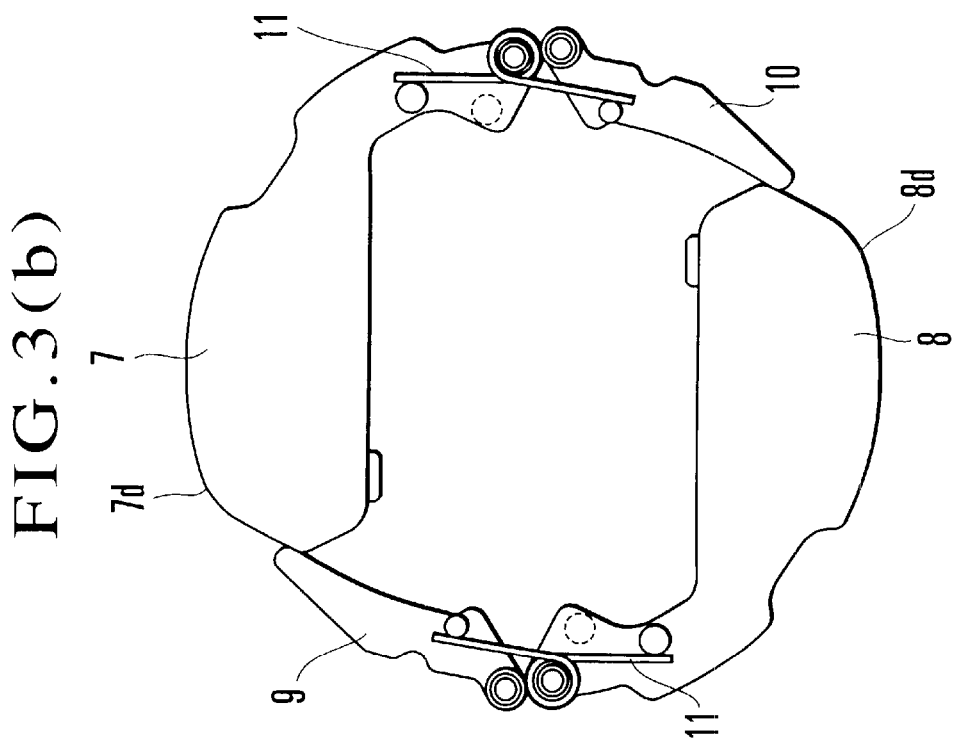
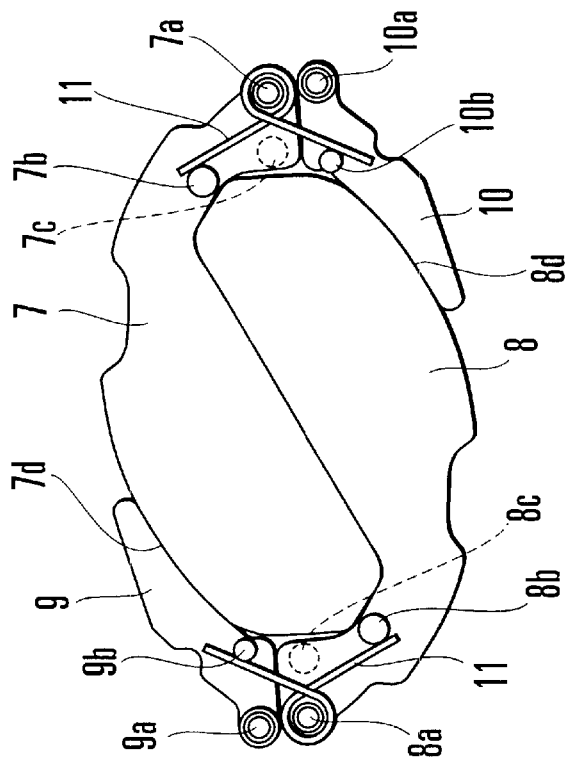

LENS BARRIER DEVICE FOR CAMERA

BACKGROUND OF THE INVENTION

1. Field of the Invention

The present invention relates to an improvement on a lens barrier device which is disposed in front of a photo-taking lens of a camera.

2. Description of Related Art

As a result of the advancement of automating devices, reduction in size and arrangement for further zooming made during recent years, cameras have come to have highly convenient functions. A lens barrier device which is disposed in front of a photo-taking lens of the camera is one of such conveniences. Generally, the lens barrier device is arranged to automatically close a barrier into a stowed state in association with the actions of a zoom mechanism and a lens-barrel drawing-in mechanism.

Further, the diameter of a lens barrel which holds a photo-taking lens decreases more and more according to the advancement of reduction in size of the camera. Some of known such barrier mechanisms have come to be composed of four blade members as it is hardly possible to cover the lens barrel with two blade members. In Japanese Laid-Open Utility Model Application No. Hei 3-69133, there is disclosed a typical barrier mechanism of the four-blade structure. In such a conventional barrier mechanism, two outer blade members are located in front (or in rear) of two inner blade members with respect to axes which are parallel with the optical axis of the lens barrel, and the two outer blade members and the two inner blade members are arranged to overlap each other in an open aperture state, so that the barrier mechanism can be stowed within a small area. Therefore, a large photo-taking aperture can be obtained.

However, the barrier mechanism having the blade members in the above-stated manner necessitates a complex mechanism for driving the four blade members. The barrier mechanism thus requires a relatively large space and a great number of parts within the camera. Further, since the four blade members are disposed in such a way as to overlap in the direction of the optical axis, the size of the barrier mechanism increases in thickness, i.e., in the direction of the optical axis. Therefore, the arrangement of the conventional barrier mechanism causes an increase in total length of the lens barrel.

BRIEF SUMMARY OF THE INVENTION

In accordance with one aspect of the invention, there is provided a lens barrier device for a camera, comprising a main blade member and an auxiliary blade member which are located on one and the same plane approximately perpendicular to an optical axis of a photo-taking lens, and a driving part which drives the main blade member and the auxiliary blade member to open and close, the auxiliary blade member being driven to open and close following the main blade member.

The above and other aspects and features of the invention will become apparent from the following detailed description of a preferred embodiment thereof taken in connection with the accompanying drawings.

BRIEF DESCRIPTION OF THE SEVERAL VIEWS OF THE DRAWING

FIGS. 3(a) and 3(b) are front views showing barrier members shown in FIGS. 1 and 2 in a closed state and in an open state, respectively.

DETAILED DESCRIPTION OF THE INVENTION

Hereinafter, a preferred embodiment of the invention will be described in detail with reference to the drawings.

Figure 1:
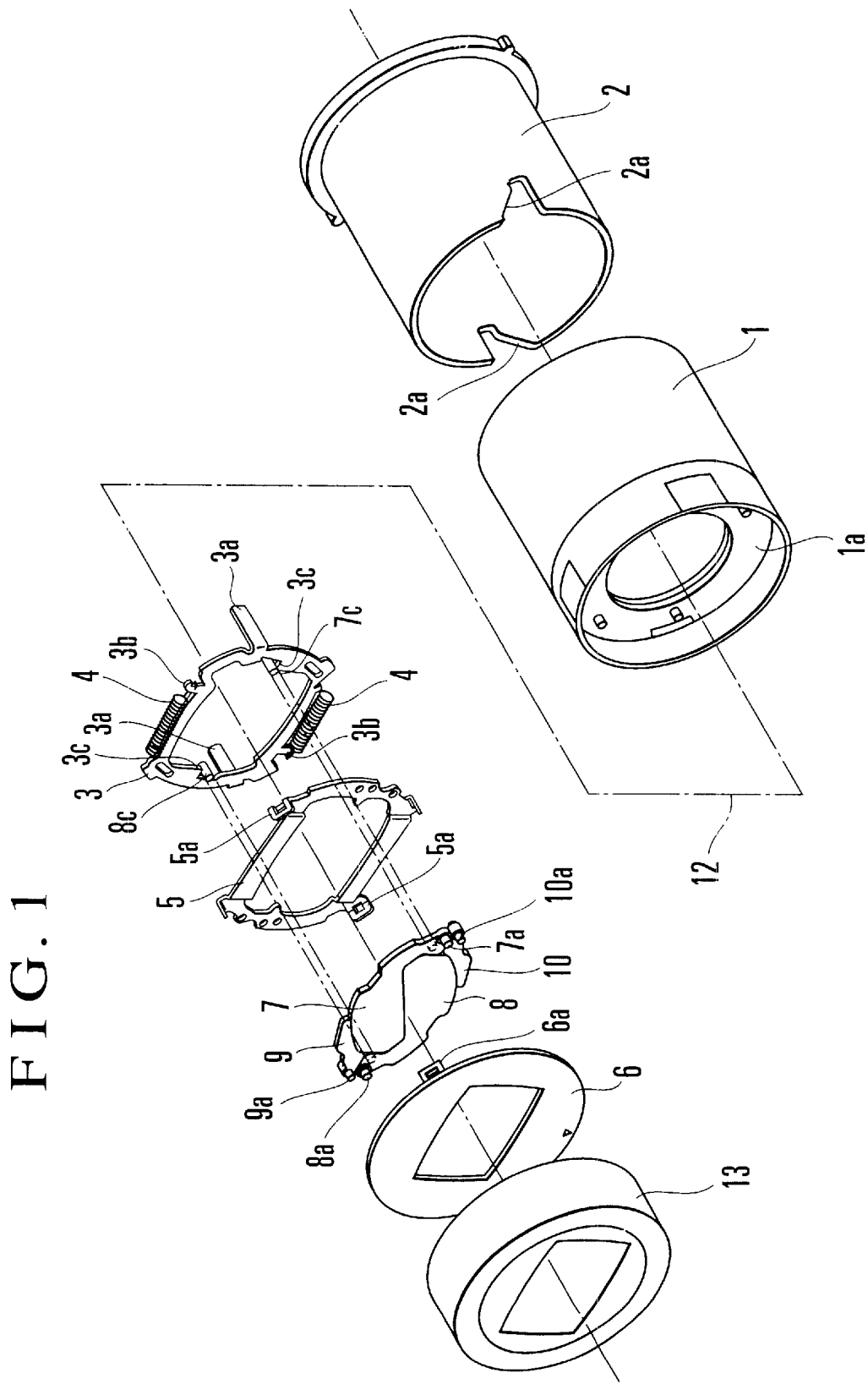
FIG. 1 is an exploded perspective view showing a lens barrier device and a part of a lens barrel mechanism which are mounted on a camera according to an embodiment of the invention.
Figure 2:
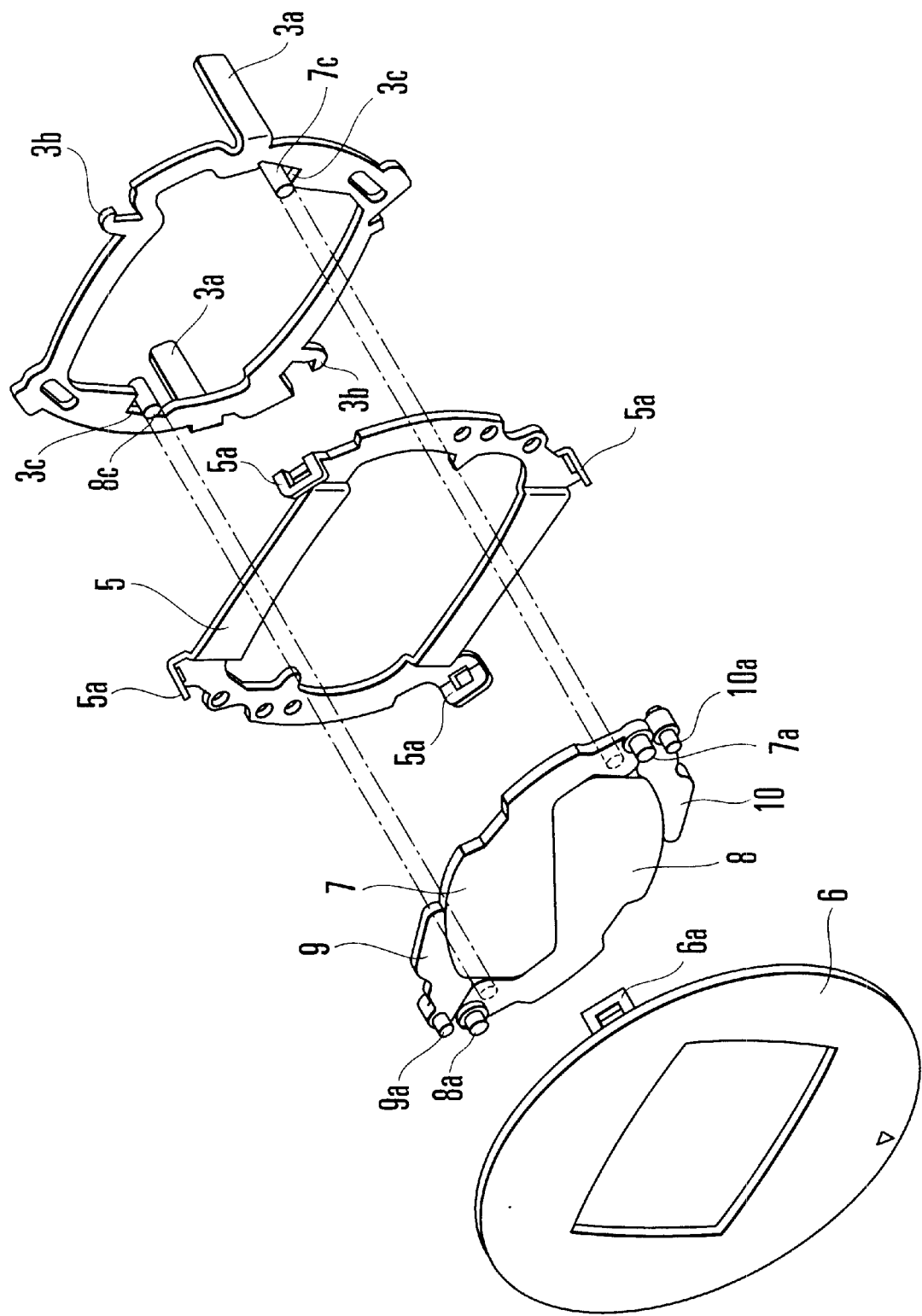
FIG. 2 is an exploded perspective view showing essential parts of the lens barrier device shown in FIG. 1.

FIG. 1 to FIGS. 3(a) and 3(b) show a lens barrier device and a part of a lens barrel mechanism which are mounted on a camera according to the embodiment of the invention. More specifically, FIG. 1 is an exploded perspective view showing the lens barrier device and the lens barrel mechanism in part. FIG. 2 is an exploded perspective view showing main parts of the lens barrel device. FIG. 3(a) and 3(b) are front views showing barrier members in a closed state and in an open state, respectively.

Referring to FIG. 1 to FIGS. 3(a) and 3(b), a first lens group tube 1 and a rectilinear motion guide tube 2 are included in a lens barrel mechanism which holds a phototaking lens (not shown), and are arranged to move back and forth in the direction of an optical axis in association the action of the lens barrel mechanism.

A barrier driving ring 3 is held by a flange part 1a of the first lens group tube 1 to be rotatable around the optical axis. Bent parts 3a of the barrier driving ring 3 extend rearward to engage cam parts 2a of the rectilinear motion guide tube 2. Blade opening springs 4 are provided between spring hooking parts 3b of the barrier driving ring 3 and the first lens group tube 1, and are thus arranged to constantly urge the barrier driving ring 3 to move counterclockwise. A barrier lower plate 5 and a barrier upper plate 6 are mounted on the front side of the first lens group tube 1 in a state of being set integrally with each other with bent parts 5a of the barrier lower plate 5 engaging projections 6a of the barrier upper plate 6.

Main blade members 7 and 8 are held between the barrier lower plate 5 and the barrier upper plate 6 in such a way as to be rotatable, respectively, around rotation shafts 7a and 8a which are parallel with the optical axis 12. On the back sides of the main blade members 7 and 8, there are respectively mounted projections 7c and 8c which extend rearward to engage edge surfaces 3c of the barrier driving ring 3. Auxiliary blade members 9 and 10 are disposed on a plane which is approximately perpendicular to the optical axis 12 and is the same as the plane on which the main blade members 7 and 8 are disposed. The auxiliary blade members 9 and 10 are held between the barrier lower plate 5 and the barrier upper plate 6 in such a way as to be rotatable respectively around rotation shafts 9a and 10a which are parallel with the optical axis 12. Blade closing springs 11 are arranged to urge the four blade members 7 to 10 respectively in the direction of closing through spring hooking projections 7b, 10b, 8b and 9b, as shown in FIG. 3(a). A barrier cover 13 is mounted on a front peripheral part of the first lens group tube 1 to hold, to the first lens group tube 1, the lens barrier device, which is composed of the barrier lower plate 5, the barrier upper plate 6, the main blade members 7 and 8, the auxiliary blade members 9 and 10 and the blade closing springs 11.

In the construction described above, the action of the lens barrier device will be described below with reference to FIG. 1 to FIGS. 3(a) and 3(b).

In the state shown in FIGS. 1, 2 and 3(a), the camera is in an inoperative state (non-photo-taking state), the barrier members, which correspond to the main blade members 7 and 8 and the auxiliary blade members 9 and 10, are in a closed state, and the lens barrel is drawn inward to a maximum extent. Under this condition, the rectilinear motion guide tube 2 is in the most advanced position with respect to the first lens group tube 1, and, by the action of the cam parts 2a on the bent parts 3a, the barrier driving ring 3 is stopped in a state in which the barrier driving ring 3 has been rotated clockwise against the urging force of the blade opening springs 4. Therefore, under this condition, the barrier members are in a closed state.

To bring the camera into an operative state from the above-stated state, the barrier members must be opened by drawing the lens barrel frontward. The actions to be performed in this instance are as follows.

When the lens barrel is drawn out by a camera standby action, the rectilinear motion guide tube 2 is caused to move rearward with respect to the first lens group tube 1. Then, with the bent parts 3a moving along the cam parts 2a, the barrier driving ring 3 rotates counterclockwise according to the urging force of the blade opening springs 4. Then, the edge surfaces 3c of the barrier driving ring 3 push the projections 7c and 8c of the main blade members 7 and 8 to cause the main blade members 7 and 8 to rotate in the direction of opening against the urging force of the blade closing springs 11. Then, following the rotation of the main blade members 7 and 8 in the opening direction, the auxiliary blade members 9 and 10 rotate in the direction of opening in a state of being pushed out along outer edge cam parts 7d and 8d of the main blade members 7 and 8. The auxiliary blade members 9 and 10 are thus caused to fully open, as shown in FIG. 3(b). In short, the auxiliary blade members 9 and 10 are driven to fully open by the main blade members 7 and 8 (see FIG. 3(a)→FIG. 3(b)).

As described in the foregoing, in association with the motion of the lens barrel, the barrier members are opened to bring about a photo-taking (shootable) state.

Next, a case where the camera is brought into an inoperative state is described.

The drawing-in action of the lens barrel causes the rectilinear motion guide tube 2 to move forward with respect to the first lens group tube 1. Then, with the bent parts 3a moving along the cam parts 2a, the barrier driving ring 3 rotates clockwise against the urging force of the blade opening springs 4. Then, the edge surfaces 3c of the barrier driving ring 3 move in the direction of parting from the projections 7c and 8c of the main blade members 7 and 8. As a result, the main blade members 7 and 8 are caused by the urging force of the blade closing springs 11 to rotate respectively in the direction of closing. Then, following the rotation of the main blade members 7 and 8, the auxiliary blade members 9 and 10 rotate along the outer edge cam parts 7d and 8d of the main blade members 7 and 8 also in the direction of closing, so that the barrier members are closed (see FIG. 3(b)→FIG. 3(a)).

As described above, the barrier members are formed by the main blade members 7 and 8 and the auxiliary blade members 9 and 10 which are arranged to be driven to open and close on one and the same plane which is approximately perpendicular to the optical axis 12. With the barrier members arranged in this manner, the auxiliary blade members 9 and 10 are driven to open and close on one and the same plane which is approximately perpendicular to the optical axis 12, following the movement of the main blade members 7 and 8. Therefore, the barrier members can be opened by driving only the main blade members 7 and 8, without necessitating any complex mechanism.

Further, since the main blade members 7 and 8 and the auxiliary blade members 9 and 10 are driven to open and close on one and the same plane which is approximately perpendicular to the optical axis 12, there exists no overlapping of the barrier members in the direction of the optical axis, so that such an arrangement permits reduction of spaces in the direction of thickness (optical axis) and thus permits the lens barrel to be more compactly arranged.

Further, since the main blade members 7 and 8 and the auxiliary blade members 9 and 10 are driven to rotate around the rotation shafts 7a, 8a, 9a and 10a which are parallel with the optical axis 12, all the barrier members are arranged to be driven by the rotating motion, which is simplest and excellent in driving efficiency. Accordingly, it is possible to simplify a holding mechanism for the barrier members and to improve the driving efficiency of the barrier members.

Further, one spring member, i.e., the blade closing spring 11, which is hooked between the main blade member 7 or 8 and the auxiliary blade member 10 or 9, urges the blade members to move in the closing direction. Therefore, it is possible to simplify the mechanical structure and to simplify the assembly process.

In addition, in the embodiment described above, the blade opening springs 4 are arranged to act on the barrier members in the direction of opening, while the blade closing springs 11 are arranged to act on the barrier members in the direction of closing. However, the same advantages mentioned above are attainable by arranging the spring members 4 to act on the barrier members in the direction of closing, and by arranging the spring members 11 to act on the barrier members in the direction of opening. In this modification, in having the barrier members closed, the auxiliary blade members 9 and 10 are driven to push the main blade members 7 and 8 in the direction of closing.

Further, in the embodiment described above, the barrier members are composed of two main blade members and two auxiliary blade members. However, the invention is not limited to the use of two main blade members and two auxiliary blade members. For example, in accordance with the invention, the total number of main blade members and auxiliary blade members may be set to at least three.

What is claimed is:

1. A lens barrier device for a camera, comprising:
   at least three blade members, including a main blade member and an auxiliary blade member, located on a plane approximately perpendicular to an optical axis of a photo-taking lens of said camera and arranged to be rotatable around axes approximately parallel with the optical axis; and
   a driving part arranged to rotate said blade members on the plane approximately perpendicular to the optical axis,
      wherein said driving part rotates said main blade member, and said auxiliary blade member is rotated by being pushed by said main blade member.

2. A lens barrier device according to claim 1, further comprising a lens barrel part arranged to hold the photo-taking lens,
   wherein said driving part rotates said main blade member and said auxiliary blade member in association with movement of said lens barrel part in the direction of the optical axis.

3. A lens barrier device according to claim 1, wherein said auxiliary blade member rotates along an outer edge of said main blade member.

4. A lens barrier device according to claim 1, wherein the axes of rotation of said blade members are located respectively adjacent to outer edges of said blade members.

5. A lens barrier device according to claim 1, wherein said main blade member is larger than said auxiliary blade member, and is arranged to cover most of an optical path of the photo-taking lens.

6. A lens barrier device for a camera, comprising:

at least three blade members, including a main blade member and an auxiliary blade member, located on a plane approximately perpendicular to an optical axis of a photo-taking lens of said camera and arranged to be rotatable around axes approximately parallel with the optical axis; and a driving part arranged to rotate said blade members on the plane approximately perpendicular to the optical axis, wherein said driving part rotates said auxiliary blade member, and said main blade member is rotated by being pushed by said auxiliary blade member.

7. A lens barrier device according to claim 6, wherein said main blade member is larger than said auxiliary blade member, and is arranged to cover most of an optical path of the photo-taking lens.

* * * * *